United States Patent [19]

Hassler, Jr.

[11] Patent Number: 4,954,931
[45] Date of Patent: Sep. 4, 1990

[54] LINEAR DIFFUSE LIGHT SOURCE

[75] Inventor: William L. Hassler, Jr., El Toro, Calif.

[73] Assignee: Parker Hannifin Corporation, Cleveland, Ohio

[21] Appl. No.: 216,750

[22] Filed: Jul. 8, 1988

[51] Int. Cl.$^5$ ............................................. F21V 8/00
[52] U.S. Cl. ..................................... 362/32; 362/255; 362/339; 362/800
[58] Field of Search .................... 362/31, 32, 339, 255, 362/800

[56] References Cited

U.S. PATENT DOCUMENTS

| | | | |
|---|---|---|---|
| 3,752,974 | 8/1973 | Baker et al. | 362/31 |
| 3,761,704 | 9/1973 | Takeichi et al. | 362/339 |
| 4,163,883 | 8/1979 | Boulanger | 362/32 |
| 4,460,940 | 7/1984 | Mori | 362/32 |
| 4,528,617 | 7/1985 | Blackington | 362/32 |
| 4,585,298 | 4/1986 | Mori | 362/32 |
| 4,751,615 | 6/1988 | Abrams | 362/31 |
| 4,779,166 | 10/1988 | Tanaka et al. | 362/32 |

FOREIGN PATENT DOCUMENTS

| | | | |
|---|---|---|---|
| 531856 | 10/1956 | Canada | 362/31 |
| 834837 | 3/1952 | Fed. Rep. of Germany | 362/31 |
| 30346 | 5/1926 | France | 362/31 |

Primary Examiner—Ira S. Lazarus
Assistant Examiner—Richard R. Cole
Attorney, Agent, or Firm—Christopher H. Morgan

[57] ABSTRACT

A light source providing a diffuse, uniform intensity of light over a length of the device. A prism of material having a relatively high index of refraction has a shape to capture light emitted longitudinally therein by light emitting diodes molded into the ends thereof. A window, such as a frosted surface of the prism, allows the light to be emitted from the prism. The window has a shape which tapers toward the light emitting diodes so that a linearly uniform amount or intensity of light is emitted along the length of the window.

3 Claims, 1 Drawing Sheet

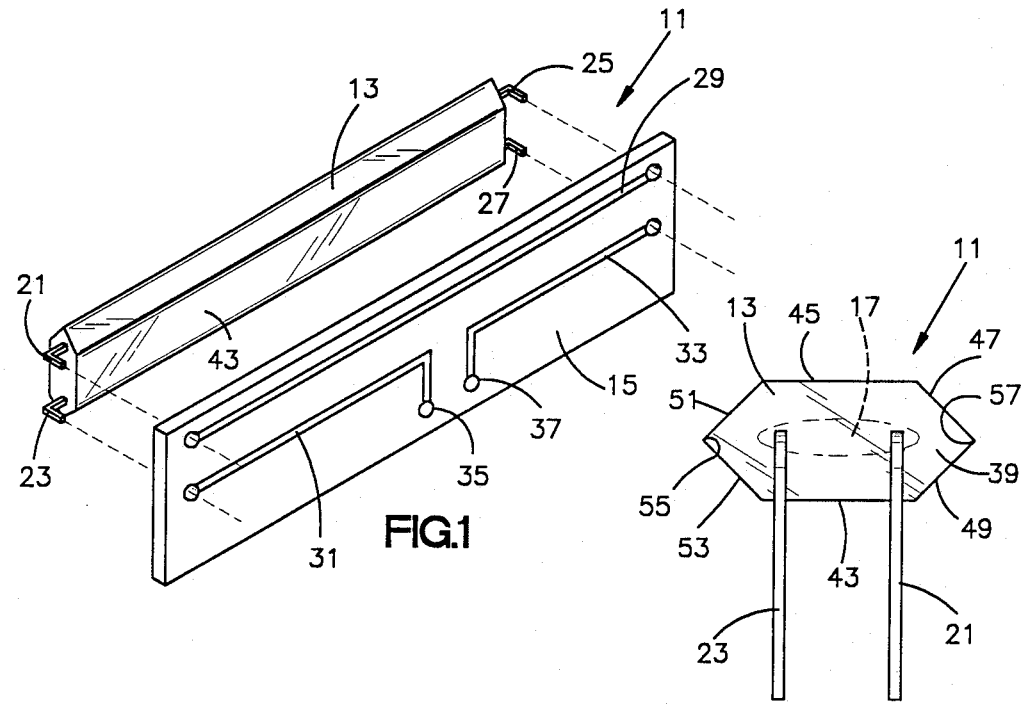
FIG.1
FIG.2
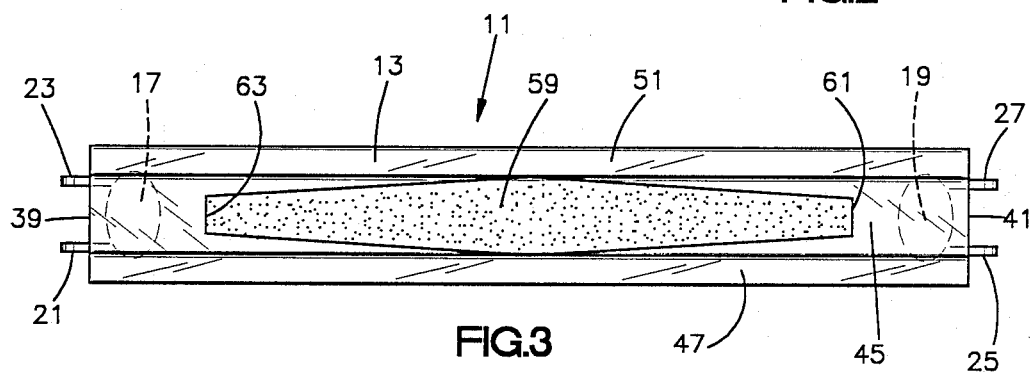
FIG.3
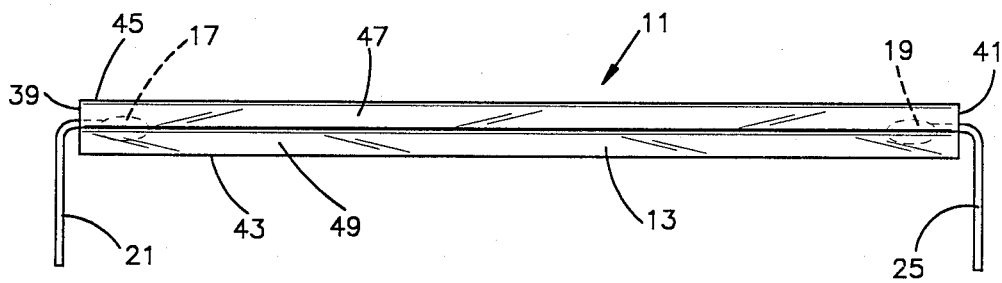
FIG.4

LINEAR DIFFUSE LIGHT SOURCE

BACKGROUND OF THE INVENTION

This invention relates in general to light sources and more particularly to diffused light sources. More particularly still this invention relates to diffused light sources which have a relatively uniform quantity of emission along a length of the light source.

DESCRIPTION OF PRIOR ART

Among the many uses of diffused light sources are uses which require a uniform dispersion of light over a predetermined length. Often these light sources must be confined to narrow or small spaces. For example, the use of charge-coupled devices to read slits or the like which allow light to pass therethrough from a light source require this type of lighting. Each pixel along the length of the charge-coupled device is desired to be acted upon by the same intensity of light. This is especially true in position sensing devices such as that shown in U.S. Pat. No. 4,074,258 where differences in light intensity or direction may cause a misreading of the position sensed by the light source and charge-coupled device.

Among the devices which are currently available for diffused, linear light emission are electoluminescent panels. Such panels are commercially available from Luminescence Systems and from Quantex. However, because of the manner in which the light is generated by these devices, they require a high alternating current voltage and have a short life. Further, these devices fade over their lives so that the intensity of light emitted is not constant. Still Further, the brightness of these devices is relatively low.

SUMMARY OF THE INVENTION

It is accordingly an object of the present invention to provide an improved light source having a diffuse linear emission. It is also an object of the present invention to provide such a device which has a low, direct current power requirement and a relatively long life.

Another object of the present invention is to provide a light source of the type described which has a relatively low cost. Yet another object of the present invention is to provide such a device which is relatively constant in its light intensity over its life and which is relatively bright. Still yet further, it is an object of the present invention to provide a device which has a relatively small package so that it can be used in applications requiring this feature.

In accordance with these objects, the present invention provides a light source for producing a relatively uniform dispersed light emissions along a length portion thereof. The device includes a prism having two ends, an emission face and a plurality of optically reflective faces. The prism is formed of an optically transparent material having a relatively high index of refraction such as polycarbonate. It is shaped to capture light emitted longitudinally therein. A light emitting means is disposed to emit light longitudinally in the prism so as to be captured therein. To provide emission of the light captured in the prism, the prism has an optically transparent and light dispersing window disposed along a length of its emission face. This window is shaped so as to narrow as it extends toward the light emitting means in a manner which provides a longitudinal uniform light intensity along the window.

Preferably, the light emitting means includes first and second light emitting diodes disposed at ends of the prism. The window comprises an emission face which is frosted so as to reduce reflection and to increase dispersion of the light captured in the prism. The window tapers linearly toward each end of the prism. To improve the capture of light it is preferable that the prism have an hexagonal cross section with right angle prism sides adjacent the emission face.

For a further understanding of the invention and further objects, features and advantages thereof, reference may now be had to the following description taken in conjunction with the accompanying drawings.

BRIEF DESCRIPTION OF THE DRAWINGS

FIG. 1 is an exploded perspective view of a device constructed in accordance with the present invention.

FIG. 2 is an end view of a portion of the device shown in FIG. 1.

FIG. 3 is a plan view of the device shown in FIG. 2.

FIG. 4 is a side view of the device shown in FIG. 2.

DESCRIPTION OF PREFERRED EMBODIMENTS

Referring now to FIG. 1, a device constructed in accordance with the present invention is shown generally at 11. The device includes a prism 13 mounted on a circuit board 15. Light emitting diodes 17 an 19 are molded into the ends of the prism 13 so that their leads extend therefrom. Leads 21 and 23 extend from light emitting diode 17 and leads 25 and 27 extend from light emitting diode 19. Leads 21 and 25 are connected to circuit path 29, lead 23 is connected to circuit path 31 and lead 27 is connected to circuit path 33. By connecting a direct current power source across the contact points 35 and 37 of circuit path 31 and 33, respectively, the light emitting diodes 17 and 19 are illuminated by their being in series connection to this power source.

As shown in FIGS. 1-4, the prism 13 has an elongated parallepiped shape. As shown in FIG. 2 the prism 13 has a hexagonal cross section. Thus, the prism 13 has a first end surface 39, a second end surface 41, a base surface 43, an upper surface 45 and side surfaces 47, 49, 51 and 53. The end surfaces 39 and 41 are planar and hexagonal in shape. The side surfaces 47, 49, 51 and 53 are planar and rectangular in shape. The base surface 43 and the upper surface 45 are planar and rectangular in shape with a width which is approximately twice the width of the side surfaces. All of the surfaces are polished or molded in a smooth way so as to be reflective.

The shape of the prism 13 is designed to capture light emitted longitudinally into the ends thereof. Particularly, sides 51 and 53 join at a right angle 55 to produce a right angle prism reflection of light rays directed from the interior of prism 13. Similarly, sides 47 and 49 join at a right angle 57 to have a right angle prism reflection of light rays directed from the interior of prism 13. Together the right angle prism 55 and the right angle prism 57 face each other across the prism 13 so as to capture the light reflected back and forth across the sides of the prism 13.

The sides 47, 49, 51 and 53 join the base surface 43 and the upper surface 45 at interior angles of 135 degrees. This insures that light reflected off of one of the sides will continue to be reflected as it traces a path along the interior of prism 13. The light emitting diodes 17 and 19 are disposed at the center of the hexagonal ends 39 and 41 so that most of the light emitted from these LED's will pass longitudinally into the prism or at least at an angle sufficient to be reflected as opposed to transmitted through the surfaces 43, 45, 47, 49, 51 and 53. Thus, the effect of the placement of the surfaces of prism 13 is to provide a light capturing tube or pipe of material. To further this object it is desirable to form the prism 13 of a substance having a relatively high index of refraction with high transparency. Polycarbonate is ideal for this purpose especially since polycarbonate is moldable and can be molded about the light emitting diodes 17 and 19. In fact, commercially available light emitting diodes 17 and 19 can have polycarbonate outer shells, as well.

The upper surface 45 of prism 13 has a window 59 disposed at its center and extending between the diodes 17 and 19. The window 59 is formed by frosting the otherwise smooth, reflective surface of surface 45. This frosting can be achieved by sandblasting or chemical etching of the mold. The frosting forms a surface which transmits as opposed to reflects and transmits in a diffused manner as opposed to a directed manner, light which encounters the frosted surface from the interior of the prism 13. The desired shape can be achieved by forming the correct shape in the mold and by injection molding of the prism.

The window 59 has a wide diamond shape with truncated ends adjacent the LED's 17 and 19. In other words, the window 59 is widest at the longitudinal center of surface 45 and tapers linearly toward the ends 39 and 41. The truncated ends 61 and 63 of window 59 are disposed so that light emitted from LED's 17 and 19 which encounters surface 45 prior to the ends 61 and 63 will be reflected internally in the prism 13.

The amount of tapering of the window 59 toward its ends 61 and 63 is empirically determined so as to provide a uniform linear emission of light along the length of window 59. Even though light is repeatedly reflected internally in the prism 13, the close proximity of the ends 63 and 61 to their respective light emitting diodes 17 and 19 requires that the windows be narrower at this point than at the center of the window 59. The amount of taper is determined so that the intensity of light emitted along the length of the window 59 is uniform.

The light emitting diodes 17 and 19 can be of a variety of types. A type which is especially suited for use with a charge-coupled device in a position sensing machine would be an infrared LED, for example Siemen's SFH487P. This device is a 50 milliamp, 1.5 volt, 20 milliwatt infrared emitter. Other light emitting diodes can be chosen for emitting light of different frequencies or having different intensities.

Although the present invention can be made in a variety of sizes, the one depicted in the drawings and described herein is approximately 2½ inches long, ⅛ inch wide and ⅛ inch in height. As can be see, this size is ideal for providing a relatively long, diffuse, linearly uniform emission of light. This is achieved while maintaining a relatively small package.

Because light emitting diodes are relatively stable, have long life and have the desired frequency characteristics, the present invention has all the advantages of the light emitted by light emitting diodes while also producing a diffuse, linearly uniform emission. A very large proportion of the light emitted by the LED's is emitted through the window 59. This is achieved with a single piece, exceptionally sturdy construction. If desired, two or more LED's can be provided in the each end of the prism 13 to provide a greater intensity of light. Also, if it is not desired to mold the LED's into the ends of the prism 13, the LED's can be attached to the ends of the prism by epoxy cement or the like.

Thus, the present invention provides a linear type of lambertian light source. This is achieved at a relatively low cost. Thus, the device of the present invention is well adapted to achieve the objects and advantages mentioned as well as those inherent therein. It will be appreciated that the instant specification and claims are set forth by way of illustration and not of limitation, and that various changes and modifications can be made without departing from the spirit and scope of the present invention.

What is claimed is:

1. A light source for producing a relatively uniform dispersed light emission along a length portion thereof, comprising:
   a prism having two ends, an emission face and a plurality of optically reflective planar faces, formed of optionally transparent material having a relatively high index of refraction and shaped to capture light emitted longitudinally therein said emission face and said reflective planar faces forming a hexagonal cross-section and said reflective faces forming right angle prism sides adjacent said emission face;
   light emitting diodes disposed at the ends of said prisms to emit light longitudinally in said prism so as to be captured therein; and
   said prism having an optically transparent and light dispersing frosted window formed in said emission face along a length of the emission face thereof, said window linearly narrowing toward the ends of said prism so as to emit through said window light captured in said prism as it is emitted from said light emitting means in a dispersed, longitudinally uniform way.

2. The light source of claim 1 wherein said prism is formed of polycarbonate.

3. The light source of claim 2 wherein said light emitting diodes are molded into the ends of said polycarbonate prism.

* * * * *